United States Patent
Kaufman et al.

(10) Patent No.: US 11,750,444 B2
(45) Date of Patent: *Sep. 5, 2023

(54) IMPLEMENTATION OF COMPLIANCE SETTINGS BY A MOBILE DEVICE FOR COMPLIANCE WITH A CONFIGURATION SCENARIO

(71) Applicant: Microsoft Technology Licensing, LLC, Redmond, WA (US)

(72) Inventors: Peter J. Kaufman, Sammamish, WA (US); Richard I. June, Monroe, WA (US); Moiz Z. Rassiwala, Kenmore, WA (US); Daniel S. Dudugjian, Woodinville, WA (US); Shayak Lahiri, Redmond, WA (US); Sean A. Bowles, Seattle, WA (US); Yuhang Zhu, Bellevue, WA (US); Adeep Singh Cheema, Bellevue, WA (US); Rama Krishna Samudrala, Bellevue, WA (US); Jitendrakumar G. Koshti, Bothell, WA (US); Gaurav Raghu Dhawan, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/384,178

(22) Filed: Jul. 23, 2021

(65) Prior Publication Data
US 2021/0351978 A1 Nov. 11, 2021

Related U.S. Application Data

(63) Continuation of application No. 16/051,145, filed on Jul. 31, 2018, now Pat. No. 11,184,223.

(51) Int. Cl.
*H04L 41/0803* (2022.01)
*G06F 9/448* (2018.01)
(Continued)

(52) U.S. Cl.
CPC ........ *H04L 41/0803* (2013.01); *G06F 9/4498* (2018.02); *G06F 9/44505* (2013.01); *H04W 8/245* (2013.01)

(58) Field of Classification Search
CPC .. H04L 41/0803; H04W 8/245; G06F 9/4498; G06F 9/44505
See application file for complete search history.

(56) References Cited

U.S. PATENT DOCUMENTS 7,516,478 B2 4/2009 Limont et al.
7,546,629 B2 6/2009 Albert et al.
(Continued)

FOREIGN PATENT DOCUMENTS

JP 2011530860 A 12/2011
JP 2014506363 A 3/2014
(Continued)

OTHER PUBLICATIONS

"Notice of Allowance Issued in U.S. Appl. No. 16/051,145", dated Jul. 21, 2021, 16 Pages.
(Continued)

*Primary Examiner* — Blake J Rubin

(57) ABSTRACT

Embodiments described herein are directed to implementing compliance settings by a computing device for bringing the computing device into compliance with a configuration scenario. For instance, a computing device may receive, from a server, configuration information describing compliance settings for implementing by the computing device to bring the computing device into compliance with a configuration scenario. Moreover, the computing device may iden-
(Continued)

tify a state machine indicated by the configuration information that describes a configuration process for implementing the compliance settings and execute the state machine to configure the computing device with the compliance settings.

20 Claims, 8 Drawing Sheets

(51) Int. Cl.
*G06F 9/445* (2018.01)
*H04W 8/24* (2009.01)

(56) References Cited

U.S. PATENT DOCUMENTS

| | | | |
|---|---|---|---|
| 8,613,070 B1 | 12/2013 | Borzycki et al. | |
| 8,849,979 B1 | 9/2014 | Qureshi | |
| 8,997,091 B1* | 3/2015 | Watson | G06F 9/4411 717/170 |
| 9,332,424 B2* | 5/2016 | Logan | H04W 12/35 |
| 9,420,002 B1* | 8/2016 | McGovern | H04L 63/20 |
| 9,705,919 B1 | 7/2017 | Jacobsen et al. | |
| 9,894,099 B1* | 2/2018 | Jacobsen | H04L 63/20 |
| 9,985,850 B2* | 5/2018 | Qureshi | H04L 43/04 |
| 10,063,594 B2 | 8/2018 | Winn et al. | |
| 10,382,275 B1* | 8/2019 | Stickle | H04L 41/0886 |
| 10,402,558 B2* | 9/2019 | Bowman | H04W 48/04 |
| 10,552,823 B1 | 2/2020 | Woodward et al. | |
| 10,776,495 B2* | 9/2020 | Sanossian | G06F 21/577 |
| 10,810,055 B1* | 10/2020 | Walker | G06F 16/2358 |
| 11,227,032 B1* | 1/2022 | Kraus | H04L 9/083 |
| 11,243,756 B1* | 2/2022 | Hussain | H04L 43/0817 |
| 2007/0143824 A1 | 6/2007 | Shahbazi et al. | |
| 2007/0169093 A1* | 7/2007 | Logan | H04W 12/35 717/168 |
| 2008/0147831 A1 | 6/2008 | Redjaian et al. | |
| 2008/0256263 A1* | 10/2008 | Nerst | H04W 92/18 709/250 |
| 2010/0071066 A1* | 3/2010 | Kline | H04L 63/1433 726/25 |
| 2010/0077444 A1 | 3/2010 | Forristal | |
| 2010/0205159 A1 | 8/2010 | Li et al. | |
| 2010/0299719 A1 | 11/2010 | Garimella et al. | |
| 2011/0246499 A1* | 10/2011 | Carmel | G06Q 10/06 707/769 |
| 2011/0252240 A1 | 10/2011 | Freedman et al. | |
| 2011/0321011 A1* | 12/2011 | Selitser | G06F 9/542 717/120 |
| 2012/0129503 A1 | 5/2012 | Lindeman et al. | |
| 2012/0173682 A1* | 7/2012 | Mantere | G06F 9/44505 709/221 |
| 2013/0007245 A1 | 1/2013 | Malik et al. | |
| 2013/0054682 A1* | 2/2013 | Malik | H04L 45/563 709/203 |
| 2014/0032691 A1 | 1/2014 | Barton et al. | |
| 2014/0108486 A1 | 4/2014 | Borzycki et al. | |
| 2014/0109177 A1 | 4/2014 | Barton et al. | |
| 2014/0148140 A1* | 5/2014 | Ahn | H04L 41/0893 455/418 |
| 2014/0280934 A1 | 9/2014 | Reagan et al. | |
| 2014/0282869 A1 | 9/2014 | Dabbiere et al. | |
| 2015/0050922 A1 | 2/2015 | Ramalingam et al. | |
| 2015/0052616 A1* | 2/2015 | Hutchison | G06F 3/0632 726/27 |
| 2015/0121506 A1 | 4/2015 | Cavanaugh | |
| 2015/0195182 A1* | 7/2015 | Mathur | H04L 41/0853 714/27 |
| 2015/0207681 A1 | 7/2015 | Limont et al. | |
| 2015/0281097 A1 | 10/2015 | Huang et al. | |
| 2015/0365293 A1 | 12/2015 | Madrigal et al. | |
| 2016/0087854 A1 | 3/2016 | Jayanti Venkata et al. | |
| 2016/0119301 A1 | 4/2016 | Thilgen | |
| 2016/0174132 A1* | 6/2016 | Hynes | H04W 4/027 455/418 |
| 2016/0277448 A1* | 9/2016 | Saida | H04M 1/72457 |
| 2017/0026420 A1 | 1/2017 | Balacheff et al. | |
| 2017/0046235 A1 | 2/2017 | Straub et al. | |
| 2017/0048252 A1 | 2/2017 | Straub et al. | |
| 2017/0091489 A1* | 3/2017 | Dragone | G06F 21/6218 |
| 2017/0201590 A1* | 7/2017 | Wojciechowski | H04L 67/1095 |
| 2017/0339564 A1* | 11/2017 | Momchilov | H04W 4/50 |
| 2017/0366646 A1 | 12/2017 | Bradley et al. | |
| 2018/0004930 A1 | 1/2018 | Csinger et al. | |
| 2018/0063088 A1* | 3/2018 | Hardy | H04L 63/0272 |
| 2018/0121659 A1* | 5/2018 | Sawhney | G06F 21/566 |
| 2018/0131751 A1* | 5/2018 | Jones | H04L 67/01 |
| 2018/0157457 A1* | 6/2018 | Paramashivaiah | G06F 3/1454 |
| 2018/0176254 A1* | 6/2018 | Lam | H04L 63/105 |
| 2018/0288045 A1* | 10/2018 | Karunakaran | H04L 63/101 |
| 2018/0293066 A1* | 10/2018 | Ali | G06F 8/65 |
| 2018/0337951 A1* | 11/2018 | Agarwal | H04L 63/20 |
| 2018/0365043 A1* | 12/2018 | Kaufman | G06F 11/3672 |
| 2019/0124401 A1* | 4/2019 | Lentner | H04N 21/4856 |
| 2020/0007396 A1* | 1/2020 | Fainberg | H04L 43/045 |
| 2020/0028879 A1 | 1/2020 | Lahiri et al. | |
| 2020/0034141 A1* | 1/2020 | Bilal | G06F 9/4451 |
| 2020/0167303 A1* | 5/2020 | Kim | G06F 13/4286 |
| 2021/0329038 A1 | 10/2021 | Lahiri et al. | |

FOREIGN PATENT DOCUMENTS

| | | |
|---|---|---|
| JP | 2017518594 A | 7/2017 |
| WO | 2006034407 A2 | 3/2006 |
| WO | 2017172818 A1 | 10/2017 |

OTHER PUBLICATIONS

Baker, Ed, "Compliance—Enterprise Mobility and Security (EMS)— How to Secure your Devices in 15 minutes (Part 2)", Retrieved From: https://blogs.technet.microsoft.com/uktechnet/2017/01/18/compliance-enterprise-mobility-and-security-ems-how-to-secure-your-devices-in-15-minutes-part-2/, Jan. 18, 2017, 16 Pages.
"International Search Report and Written Opinion Issued in PCT Application No. PCT/US19/037839", dated Oct. 10, 2019, 11 Pages.
"Non Final Office Action Issued in U.S. Appl. No. 16/037,201", dated Apr. 29, 2020, 8 Pages.
"Final Office Action Issued in U.S. Appl. No. 16/037,201", dated Aug. 28, 2020, 10 Pages.
"Non Final Office Action Issued in U.S. Appl. No. 16/037,201", dated Jan. 26, 2021, 13 Pages.
"Explore the Built-in Mobile Device Management (MDM) Feature for Office 365", Retrieved From: https://www.microsoft.com/en-us/microsoft-365/blog/2015/07/21/explore-the-built-in-mobile-device-management-mdm-feature-for-office-365/, Jul. 21, 2015, 9 Pages.
"Office Action Issued in Indian Patent Application No. 202047054855", dated Oct. 20, 2022, 7 Pages.
"Office Action Issued in Indian Patent Application No. 202047057043", dated Oct. 12, 2022, 7 Pages.
"Notice of Allowance Issued in U.S. Appl. No. 17/363,988", dated Nov. 4, 2022, 16 Pages.
"Office Action Issued in European Patent Application No. 19740241.5", dated Dec. 13, 2022, 7 Pages.
"Notice of Allowance Issued in U.S. Appl. No. 17/363,988", dated Feb. 10, 2023, 9 Pages.
"Office Action Issued in Japanese Patent Application No. 2021-505190", dated Jun. 1, 2023, 9 Pages.

\* cited by examiner

IMPLEMENTATION OF COMPLIANCE SETTINGS BY A MOBILE DEVICE FOR COMPLIANCE WITH A CONFIGURATION SCENARIO

CROSS-REFERENCE TO RELATED APPLICATIONS

This application is a continuation of U.S. application Ser. No. 16/051,145, filed Jul. 31, 2018, entitled "Implementation of Compliance Settings by a Mobile Device for Compliance with a Configuration Scenario," now allowed, which is incorporated by reference in its entirety herein.

BACKGROUND

Mobile device management (MDM) is a way to ensure employees stay productive and do not breach corporate policies. Many organizations control activities of their employees using MDM products/services. MDM primarily deals with corporate data segregation, securing mails, securing corporate documents on devices, enforcing corporate policies, and integrating and managing mobile devices, including laptops and handholds of various categories. By controlling and protecting the data and configuration settings of all mobile devices in an organization's network. MDM can reduce support costs and business risks.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Embodiments described herein are directed to implementing compliance settings by a computing device for bringing the computing device into compliance with a configuration scenario. For instance, a computing device may receive, from a server, configuration information describing compliance settings for implementing by the computing device to bring the computing device into compliance with a configuration scenario. Moreover, the computing device may identify a state machine indicated by the configuration information (e.g., by an identifier) that describes a configuration process for implementing the compliance settings. The state machine may be executed to configure the computing device with the compliance settings. When executing the state machine, payloads included in the configuration information along with dependencies may be processed in the order as dictated by the state machine, to configure the computing device.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments and, together with the description, further serve to explain the principles of the embodiments and to enable a person skilled in the pertinent art to make and use the embodiments.

Figure 1:
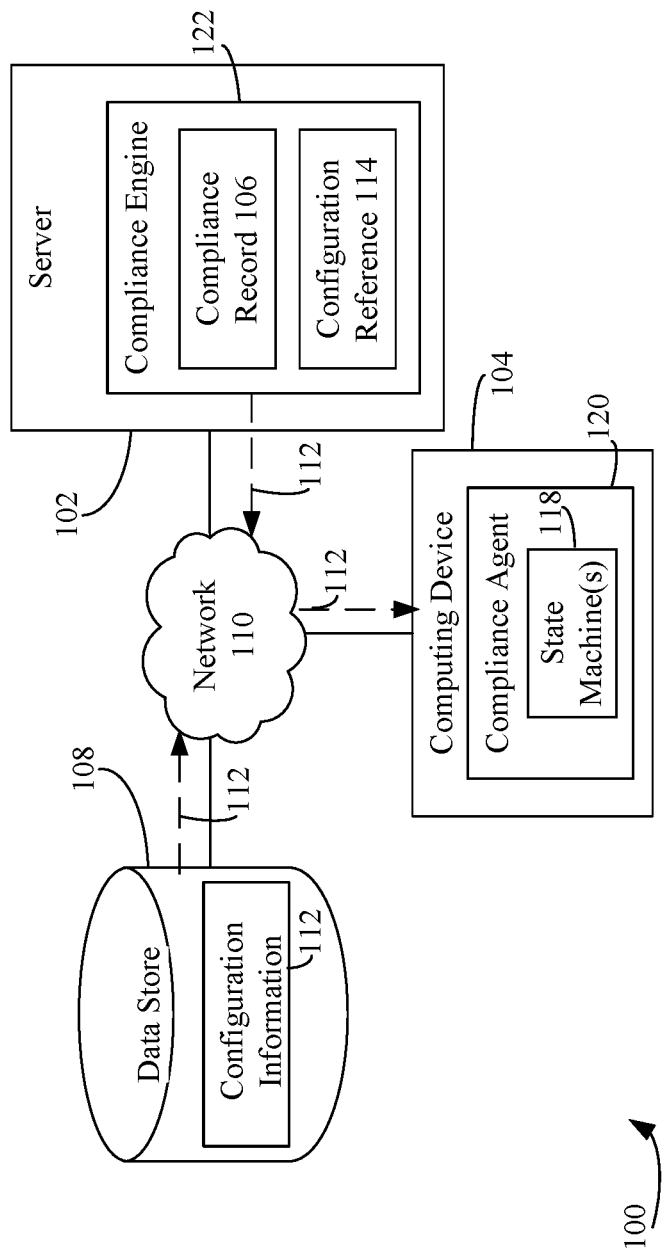
FIG. 1 depicts a block diagram of a system for implementing compliance settings by a computing device to bring the computing device into compliance with a configuration scenario in accordance with an example embodiment.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The present specification and accompanying drawings disclose one or more embodiments that incorporate the features of the present invention. The scope of the present invention is not limited to the disclosed embodiments. The disclosed embodiments merely exemplify the present invention, and modified versions of the disclosed embodiments are also encompassed by the present invention. Embodiments of the present invention are defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. System and Method for Managing Device Compliance

A typical construct of today's mobile device management (MDM) process for an enterprise uses a MDM server to be responsible for executing and monitoring mobile device configurations, storing massive amounts of data, and performing continuous error checks and preventative maintenance. Such functions may be performed for large numbers of devices for the enterprise, including hundreds, thousands, tens of thousands, millions, hundreds of millions, and even greater numbers of devices. As a result, the server churns countless 'computing calories' (e.g., uses a large amount of processing power) to determine if all of the mobile technology resources of the enterprise's network are configured correctly, functioning within the confines of security and other important protocols, and implementing and complying with updates.

This means that the server is encumbered by having to communicate with many individual mobile devices on the enterprise's network and to ultimately oversee the configuration process and reporting needs. Scalability proves very challenging for an enterprise in this scenario, simply given the number of devices, sheer traffic, and configuration volume. In other words, the server has a tremendous amount of work to manage. Moreover, this configuration process may also be fraught with otherwise preventable errors due to the un-streamlined and device-specific nature of configuration enforcement.

These limitations can ultimately be remedied by changing the server's involvement in the device management process. For example, in embodiments, the server may experience greater productivity by requiring the mobile device to conduct its own configuration. In the embodiments described herein, the server may supply the configuration details to the mobile device and the configuration process may be driven by the mobile device by acting as a generalized state machine. These and further embodiments are described in additional detail with respect to FIG. 1, as follows. Note that embodiments described herein are applicable to any operating system/computing platform, such as Apple iOS®, and Google Android™ and that references herein to Microsoft® Windows®, and/or component thereof, are for descriptive and illustrative purposes only, and are not to be considered limiting.

FIG. 1 is a block diagram of a compliance enforcement system 100 for implementing compliance settings by computing devices for bringing the computing devices into compliance with configuration scenarios, in accordance with an example embodiment. As shown in FIG. 1, system 100 includes a server 102, a computing device 104, and one or more data stores 108 communicatively coupled via an enterprise network 110. Server 102 includes a compliance engine 122. Computing device 104 includes a compliance agent 120. Although a single computing device 104 is shown, any number of computing devices may be present in system 100 that have compliance settings provided by server 102, including tens, hundreds, thousands, tens of thousands, millions, hundreds of millions, and greater numbers of computing devices. Data store(s) 108 may comprise one or more physical memory and/or storage device(s). Data store (s) 108 may be any type of physical memory and/or storage device that is described herein, and/or as would be understood by a person of skill in the relevant art(s) having the benefit of this disclosure. Enterprise network 110 comprises a private computer network established by an enterprise for the purposes of interconnecting enterprise devices (e.g., computing device 104 and further computing devices not shown) at one or more enterprise locations to other enterprise devices and to enable enterprise devices to access and/or share computing resources.

Computing device 104 is a device utilized by or otherwise accessible to one or more members (e.g., employees) of an enterprise. As used herein, the term "enterprise" broadly refers to any of a wide variety of organization types, including businesses, non-profit organizations, and government agencies. Users of computing device 104 may be referred to herein as "enterprise users" or simply "users". Computing device 104 may comprise, for example and without limitation, a desktop computer, a laptop computer, a tablet computer, a netbook, a smartphone, or the like. Additional examples of computing device 104 are described below with reference to FIGS. 8 and 9.

Data store(s) 108 may be configured to store configuration information 112 for computing device 104 and/or one or more other computing devices. In embodiments, configuration information 112 may be stored locally in memory of server 102. Configuration information 112 may specify one or more compliance settings for computing device 104 and/or for users of computing device 104, as well as including data, one or more files, etc., for installing on computing device 112 according to the particular configuration scenario. For example, a first compliance setting of configuration information 112 may be associated with a first user of computing device 104, and a second compliance setting of configuration information 112 may be associated with a second user of computing device 104. Examples of compliance settings include, but are not limited to, an encryption setting to be implemented by computing device 104, a security setting to be implemented by computing device 104, a minimum version of at least one of an application or an operating system required to be installed on computing device 104, etc. The encryption setting(s) may specify whether a storage device included in computing device 104 is to be encrypted (e.g., via an encryption program, such as, but not limited to BitLocker™). The security settings may specify a password policy to be implemented by computing device 104 (e.g., setting the password length to a minimum of 10 characters, 12 characters, etc.), whether code signing should be implemented by computing device 104, whether a trusted platform module (TPM) should be implemented by computing device 104, etc. It is noted that the compliance settings described above are purely exemplary and that other configuration settings may be used.

Server 102 may be configured to manage compliance of computing device, including computing device 104, with respect to configuration scenarios. Such computing devices may include stationary devices (e.g., desktop computers) and/or mobile devices (e.g., smart phones, laptops, tablet computers, wearable computing devices (e.g., a head-mounted device including smart glasses such as Google® Glass™, virtual reality headsets, smart watches, etc.), etc.). When managing mobile devices, server 102 may also be referred to as a mobile device manager (MDM). A configuration scenario may be as simple as a discrete set of policies or a as complex as a configuration for a virtual private network (VPN) connection. A policy (e.g., a data and/or security policy) may be specified by an enterprise. The policy may be specified in accordance with one or more compliance settings(s). The compliance settings(s) may be specified by an administrator of the enterprise (e.g., an IT (information technology) administrator or other person within an enterprise who may be responsible for deploying, maintaining and/or configuring computing device 104 on behalf of enterprise users).

As shown in FIG. 1, server 102 comprises a compliance engine 122. Compliance engine 122 may determine configuration information 112 to be provided to computing device 104 and provide the determined configuration information 112 to computing device 104. For example, server 102 may receive and/or access configuration information 112 in the form of a compliance manifest or other document that indicates configuration settings for deployment to a particular set of devices. Server 102 may obtain configuration information 112 via network 110 from data store 108 and provide configuration information 112 to the indicated devices, such as computing device 104, via network 110. Transmission of configuration information 112 over network 110 is depicted in FIG. 1 by dash lines 112. Configuration information 112 may specify compliance settings for implementing by computing device 104 (and optionally further devices) to bring computing device 104 into compliance with a configuration scenario.

Computing device 104 may be configured to implement the compliance setting(s) specified by configuration information 112. As shown in FIG. 1, computing device 104 comprises compliance agent 120. Computing device 104 may be configured to execute compliance agent 120, which is configured to implement compliance settings specified by received configuration information 112 by identifying and executing a state machine that describes a configuration process for implementing the compliance settings for a configuration scenario on computing device 104. For example, compliance agent 120 may identify state machine 118 as the state machine indicated by configuration information 112 and execute state machine 118 to configure computing device 104 with compliance settings for compliance with a configuration scenario.

In accordance with embodiments, state machine 118 may be generated in various ways. For example, during a build process, one or more documents may be generated (e.g., by a developer), which may be compiled and stored on computing device 104. For example, one or more files describing configuration scenarios, which enable a server to consume and render a user interface (UI) (e.g., at an admin console generated by compliance engine 122 at server 102), and a state machine are generated during the build. This UI allows an IT Admin to enter configuration information for a particular configuration scenario that may then be sent to computing device 104. The configuration information is processed by computing device 104 as described herein, utilizing a configuration service provider (CSP) to alter the security and functional behavior of the computing device according to the particular configuration scenario. A CSP is an interface to read, set, modify, or delete configuration settings on a device. Moreover, when processing a state machine (e.g., state machine 118), CSPs are invoked according to an order dictated by the state machine to fulfill the desired state at a computing device using configuration information supplied by a server.

After implementing the configuration settings according to state machine 118, compliance agent 120 may provide an acknowledgment (e.g., an "alert") to compliance engine 122. The acknowledgment indicates that the computing device has implemented the configuration settings, or a failure occurred. Upon receiving the acknowledgment indicating success at implementing the configuration settings, compliance engine 112 may designate computing device 104 as being in compliance with the configuration scenario. Compliance engine 112 may maintain the acknowledgments in various ways.

For example, server 102 may maintain a compliance record 106 that includes a designation for each user-device pairing as to whether the particular user-device pairing is in compliance. For example, compliance record 106 may comprise a data structure (e.g., a table) comprising a plurality of entries, where each entry specifies a particular user-device pair, and an indication as to whether that user-device pair is compliance. Server 102 may be further configured to maintain a local configuration reference 114 of the configuration settings implemented for each user-device pairing. Configuration reference 114 may comprise a data structure (e.g., a table) comprising a plurality of entries, where each entry specifies a particular user-device pair and the configuration settings implemented by that pair. It is noted that the structure and/or organization of configuration reference 114 and/or compliance record 106 described above is purely exemplary and that other structures and/or organizations may be used. Configuration reference 114 and compliance record 106 may be maintained by server 102 in any location and manner, including being stored in data store 108 or elsewhere.

Compliance engine 122 may be configured to determine whether computing device(s) 104 remain in compliance with compliance rules using reference 114. By doing so, compliance engine 122 simply needs to access reference 114 to determine the configuration settings implemented by computing device(s) 104, rather than having to query computing device(s) 104 for their configuration settings. Compliance engine 122 may determine whether computing device(s) 104 remain in compliance upon detecting any suitable triggering event, including an expiration of a predetermined time period, a request from an administrator, auditor, and/or other person and/or entity that manages, desires to confirm, or is otherwise interested in knowing/confirming whether computing device 104 and/or other computing devices are in compliance with one or more compliance settings and/or requirements. A request for determining whether devices are in compliance with compliance settings/requirements may relate to any number of devices, including hundreds, thousands, or millions of devices. As such, by accessing such compliance information from configuration reference 114 and/or compliance record 106, a large amount of processing power need not be expended by server 102 relative to having to poll each device of interest separately.

Figure 2A:
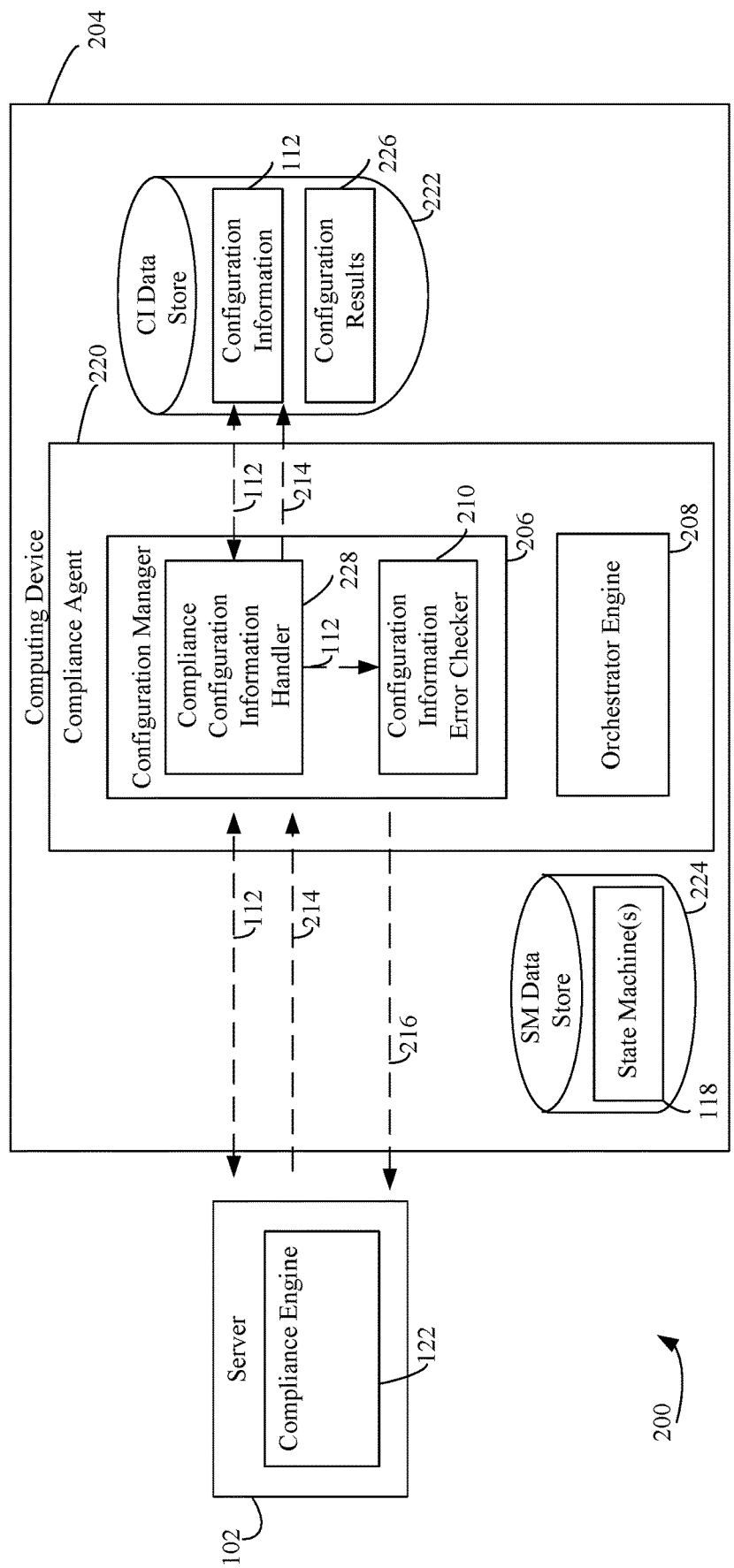
FIG. 2A depicts a block diagram of a system for implementing compliance settings by a computing device to bring the computing device into compliance with a configuration scenario, that is a further detailed example of the system of FIG. 1, in accordance with an example embodiment.

System 100 of FIG. 1 may be implemented in various ways, in embodiments. For instance, FIG. 2A depicts a detailed block diagram of system 200, according to an example embodiment. System 200 is an example of system 100. As shown in FIG. 2A, system 200 includes server 102 and a computing device 204. Computing device 204 is an example of computing device 104, as described above with reference to FIG. 1. As further shown in FIG. 2A, computing device 204 includes a compliance agent 220, a state machine (SM) data store 224, and a configuration information (CI) data store 222. State machine data store 224 and configuration information data store 222 may each comprise one or more physical memory and/or storage device(s), including any type of physical memory and/or storage device that is described herein, and/or as would be understood by a person of skill in the relevant art(s) having the benefit of this disclosure. Compliance agent 220 is an example of compliance agent 120, as described above with reference to FIG. 1.

Server 102 is configured to determine configuration information 112 to be provided to computing device 204 and provide the determined configuration information 112 thereto. For example, when a user first logs into a computing device newly provisioned thereto, server 102 may retrieve device configuration information 112 associated with that computing device and/or user and provide configuration information 112 to the computing device. Additionally, or alternatively, server 102 may retrieve configuration information 112 associated with that computing device and/or user and provide configuration information 112 to the computing device when software or firmware (including a device driver) is newly installed to the computing device, when new hardware is added to the computing device, when software and/or firmware is updated or deleted from the computing device, when hardware is removed from the computing device, and/or during other events that modify a configuration of the computing device.

Similar to computing device 104 described with reference to FIG. 1, computing device 204 may be configured to execute compliance agent 220, which is configured to implement the configuration settings specified by configuration information 112. More specifically, compliance agent 220 consumes an appropriate state machine based on the desired configuration scenario. Server 102 may provide a "configuration scenario identifier" in configuration information 112 to specify to computing device 204 the appropriate state machine. Compliance agent 220 may utilize this identifier to find the correct state machine for the orchestrator to follow. Configuration information 112, supplied by server 102, is then provided to the appropriate CSPs by compliance agent 220 based on the state machine, as described in further detail below.

As shown in FIG. 2A, compliance agent 220 includes a configuration manager 206 and an orchestrator engine 208. Furthermore, configuration manager 206 includes a compliance configuration information handler 228 and a configuration information error checker 210.

Compliance configuration information handler 228 may be configured to access configuration information 112 (e.g., delivery to computing device 204 via SyncML or CDN (Content Delivery Network)) from compliance engine 122 of server 102 and store configuration information 112 in configuration information data store 222 (as depicted by dashed lines 112 in FIG. 2A between server 112, compliance configuration information handler 228, and configuration information data store 222). As another example, configuration information 112 may be supplied by JavaScript Object Notation (JSON). Configuration information 112 may be delivered by a server to computing device directly or the server may instruct the computing device where to obtain configuration information 112 via CDN (which is described in more detail below).

Configuration information 112 may have any suitable form. In accordance with an embodiment, configuration information 112 may be represented by an Extensible Markup Language (XML) file including a payload associated with the compliance settings and a corresponding Uniform Resource Identifier (URI) for downloading and processing of the payload. For example, a CDN stored payload may include a separate tag that denotes the URI for asynchronous downloading and processing of the payload. To further illustrate, a simple configuration scenario for a set of discrete policies (e.g., provided by a policy CSP) may only require a single payload included in an XML file. For more complex configuration scenarios (e.g., a configuration for a VPN connection), multiple payloads may need to be specified in an XML file. For example, in the VPN configuration scenario, a profile payload and a certificate payload may be provided. These scenario configuration files may be created by a server before attempting a sync session with a computing device. This avoids creating the same file on demand for each computing device interacting with the server and leaves the server available to perform more useful work, thereby increasing scalability.

Below is an example of a scenario configuration XML file that indicates policies to be set by a policy CSP, which includes multiple declarative configuration payloads. Note "Id", "checksum", and "OSDefinedScenario" attributes of the example scenario configuration XML file make up a unique identifier. Further note that the "OSDefinedScenario" attribute in this example indicates that this is a published configuration scenario, meaning that the configuration scenario will rely upon a declared configuration scenario state machine that dictates how to configure the configuration scenario. This state machine may be stored in a registry after an operating system (OS) build compiles a declared configuration scenario state machine Windows® manifest. Furthermore, there may be no need to specify whether each payload should be atomic or whether the entire document should be atomic because this behavior may be specified in the state machine. In addition, the XML file below sets some computing device wide policies and configures an example encryption feature (i.e., Microsoft® BitLocker™):

```
<DeclaredConfiguration context="Device" schema="1.0" id="12345"
    OSDefinedScenario="MSFTMinimumSecurityBaseline"
    checksum="22280"
    operation="Set">
  <CSP name="./Vendor/MSFT/Policy" >
    <URI path="Config/DeviceLock/DevicePasswordEnabled"
    type="int">0</URI>
    <URI path="Config/DeviceLock/AllowSimplePassword"
    type="int">1</URI>
    <URI path="Config/DeviceLock/MinDevicePasswordlength"
    type="int">6</URI>
    <URI
    path="Config/ApplicationManagement/AllowAllTrustedApps"
       type="int">1</URI>
    <URI path="Config/Experience/TestPolicyBinary"
       type="b64">BAMCAQ==</URI>
    <URI path="Config/Browser/HomePages"
    type="chr">Hello world!</URI>
    <URI path="Config/Experience/BogusPolicy"
    type="chr">Hello world!</URI>
  </CSP>
  <CSP name="./Vendor/MSFT/BitLocker"
    <URI path="RequireStorageCardEncryption" type="int">1</URI>
    <URI path="RequireDeviceEncryption" type="int">1</URI>
    <URI path="EncryptionMethodByDriveType" type="chr">
```

-continued

```
    <![CDATA[<enabled/>
<data id="EncryptionMethodWithXtsOsDropDown_Name" value="4"/>
<data id="EncryptionMethodWithXtsFdvDropDown_Name"
value="7"/>
<data id="EncryptionMethodWithXtsRdvDropDown_Name"
value="4/>]]>
      </URI>
    </CSP>
</DeclaredConfiguration>
```

Below is an example of a multi-payload XML file that describes a configuration scenario defined by a MDM. In this example, because there is no declared configuration scenario state machine:

```
<DeclaredConfiguration context="Device" schema="1.0" id="12346"
    MDMDefinedScenario="optional My Blah Scenario"
    atomic"false"
    checksum="5567" operation="Ser">
  <CSP name="./Vendor/MSFT/Policy">
    <URI path="Config/DeviceLock/DevicePasswordEnabled"
      type="Int">0</URI>
    <URI path="Config/DeviceLock/AllowSimplePassword"
      type="Int">1</URI>
    <URI path="Config/DeviceLock/MinDevicePasswordlength"
      type="Int">6</URI>
    <URI
    path="Config/ApplicationManagement/AllowAllTrustedApps"
      type="Int">1</URI>
    <URI path="Config/Experience/TestPolicyBinary"
      type="b64">BAMCAQ==</URI>
    <URI path="Config/Browser/HomePages"
      type="chr">Hello world!</URI>
    <URI path="Config/Experience/BogusPolicy"
      type="chr">Hello world!</URI>
  </CSP>
  <CSP name="./Vendor/MSFT/BitLocker" atomic="true">
    <URI path="RequireStorageCardEncryption"
      type="int">1</URI>
    <URI path="RequireDeviceEncryption" type="int">1</URI>
    <URI path="EncryptionMethodByDriveType" type="chr">
      <![CDATA[<enabled/>
<data id="EncryptionMethodWithXtsOsDropDown_Name"
value="4"/>
<data id="EncryptionMethodWithXtsFdvDropDown_Name"
value="7"/>
<data id="EncryptionMethodWithXtsRdvDropDown_Name"
value="4"/>]]>
      </URI>
    </CSP>
</DeclaredConfiguration>
```

Compliance configuration information handler 228 may be further configured to request (e.g., using a Hypertext Transfer Protocol (HTTP) GET method request) from server 102 configuration information 112 and to provide configuration information 112 to configuration information error checker 210.

Configuration information error checker 210 may be configured to parse configuration information 112, determine an error in configuration information 112 (e.g., errors with the XML code, attributes, URIs in an XML configuration scenario file, etc.), and request correction of the error from server 102. For instance, in the example discussed above in which configuration information 112 is represented as an XML file, configuration information error checker 210 may parse and verify the XML code, store the URIs in a registry location, and if any errors are detected, synchronously report the errors to server 102 and request the errors be amended by server 102 (as depicted in FIG. 2A by dashed line 216). Conventionally, an MDM server ensures that there are no conflicts or errors in the configuration information. However, the client device detecting conflicts and errors allows for immediate feedback to be provided to a MDM server and for fast correction of any errors in configuration information.

Compliance configuration information handler 228 may be further configured to transmit stored configuration information 112 to server 102, and receive updated configuration information and/or additional configuration information from server 102 in response to sending the configuration information to server 102. For example, compliance configuration information handler 228 may be configured to verify the status (e.g., out of date or stale) of configuration information data 112 stored in configuration information data store 222 by sending it to server 102, and based on the status of stored configuration information 112 determined by server 102, server 102 may provide compliance configuration information handler 228 with updated configuration information and/or additional configuration information. Subsequently, compliance configuration information handler 228 may store the received updated configuration information and/or additional configuration information in configuration information data store 222 (as depicted in FIG. 2A by dashed lines 214). As described as follows, orchestrator engine 208 of compliance agent 220 is configured to implement the configuration settings received in configuration information 112, and generates configuration results 226 based thereon.

Figure 2B:
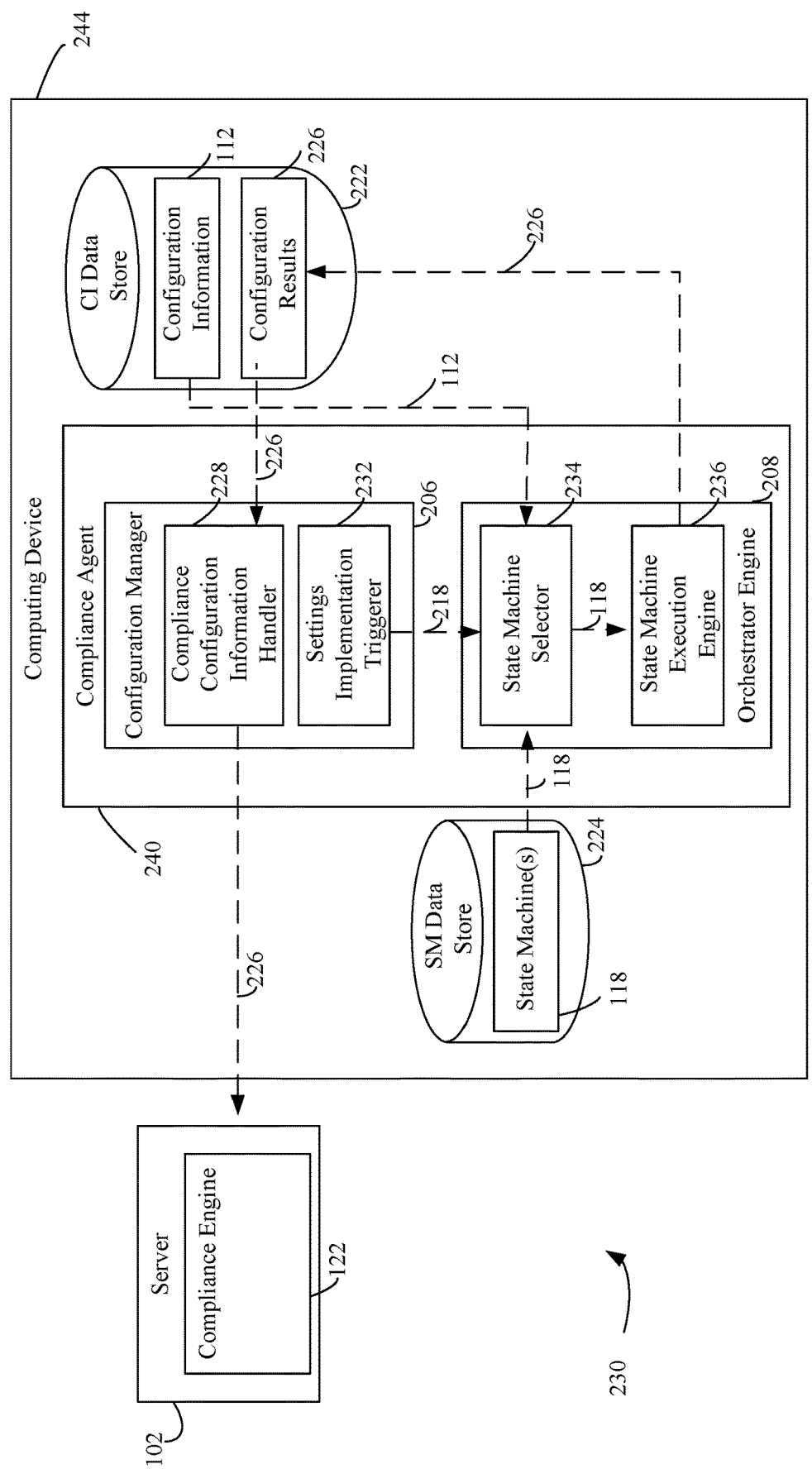
FIG. 2B depicts another block diagram of a system for implementing compliance settings by a computing device for bringing the computing device into compliance with a configuration scenario, that is a further detailed example of the system of FIG. 1, in accordance with an example embodiment.

In particular, FIG. 2B depicts a detailed block diagram of system 230, according to an example embodiment. System 230 is a further example of system 100. As shown in FIG. 2B, system 230 includes server 102 and a computing device 244. Computing device 244 is a further example of computing device 104 of FIG. 1. Furthermore, computing device 244 includes a compliance agent 240, SM data store 224, and configuration information data store 222. Compliance agent 240 is a further example of compliance agent 120, as described above with reference to FIG. 1.

Similar to computing device 104 described with reference to FIG. 1, computing device 244 executes compliance agent 240, which is configured to implement the configuration settings specified by configuration information 112. As shown in FIG. 2B, compliance agent 240 includes configuration manager 206 and orchestrator engine 208. Configuration manager 206 includes compliance configuration information handler 228 and a settings implementation triggerer 232. Orchestrator engine 208 includes a state machine selector 234 and a state machine execution engine 236. These features of compliance agent 240 are described as follows.

Settings implementation triggerer 232 is configured to trigger orchestrator engine 208 to implement compliance settings described by configuration information 112 in computing device 244. For example, as shown in FIG. 2B, settings implementation triggerer 232 provides a trigger 218 to state machine selector 234. More specifically, trigger 218 may cause the scheduling of a task (and the scheduled task may be triggered by a "DeclaredConfiguration" CSP) after configuration information error checker 210 parses and verifies configuration information 112, as described above with reference to FIG. 2A. In accordance to embodiments, the task may be stored in an activity queue and processed after any unprocessed tasks stored in the activity queue have been processed.

State machine selector 234 is configured to receive a trigger from settings implementation triggerer 232 to implement compliance settings in computing device 244. In an embodiment, state machine selector 234 identifies a state machine indicated by configuration information 112 that describes a configuration process for implementing the compliance settings. After receiving trigger 218, state selector machine 234 may obtain stored configuration information 112 from configuration information data store 222 and determine that state machine 118 is associated with configuration information 112 after consuming attributes of stored configuration information 112. For instance, configuration information 112 may specify an identifier for a particular state machine.

State machine selector 234 may be further configured to provide state machine 118 to state machine execution engine 236. State machine execution engine 236 is configured to execute state machine 118 to configure computing device 244 with compliance settings described in configuration information 112. For example, state machine selector 234 may process payloads included in configuration information 112 (as described with reference to FIG. 2A) along with dependencies in the order as dictated by state machine 118. Alternatively, if there is no state machine associated with configuration information 112, then payloads specified by configuration information 112 are processed in the order dictated by configuration information 112. Further, state machine selector 234 may access state machine data store 224 to obtain a manifest of state machine 118. The manifest may include state machine 118 and its dependencies.

An example XML file of a declared configuration scenario state machine manifest is reproduced below.

```
<?xml version="1.0" encoding="utf-8"?>
<DeclaredConfigurationScenarioStateMachine>
    <StateMachine name="MSFTMinimumSecurityBaseline"
        extensionDLL=
        "%SYSTEMROOT%\system32\MSFTMinimumSecurityBaseline.
        dll" start="SetGeneralPolicies">
        <State name="SetGeneralPolicies" defaultGoto="SetBitlocker">
            <InputArguments></InputArguments>
            <OutputArguments></OutputArguments>
            <CSP name="./Vendor/MSFT/Policy" >
                <URI path="Config/DeviceLock/DevicePasswordEnabled"
                type="int">0</URI> <!-- Has to be zero since values is set-->
                <URI path=
                "Config/DeviceLock/AllowSimplePassword"></URI>
                <URI path=
                "Config/DeviceLock/MinDevicePasswordlength"></URI>
                <URI path=
                "Config/ApplicationManagement/
                AllowAllTrustedApps"></URI>
            </CSP>
        </State>
        <State name="SetBitocker">
            <InputArguments></InputArguments>
            <OutputArguments>
                <Arg name="Status" type="int"/>
            </OutputArguments>
            <URI path="RequireStorageCardEncryption"
            type="int">1</URI>
            <URI path="RequireDeviceEncryption" type="int">1</URI>
            <URI path="EncryptionMethodByDriveType"></URI>
        </State>
    </StateMachine>
</DeclaredConfigurationScenarioStateMachine>
```

State machine execution engine 236 may be further configured to store configuration results 226 (e.g., an XML file with the URIs and values, events, last error code, status etc.) in configuration information data store 222. For example, configuration results 226 may include one or more compliance records 106 and/or configuration references 114 described above with respect to FIG. 1. Compliance configuration information handler 228 may be configured to obtain configuration results 226 from configuration information data store 222 and provide configuration results 226 to compliance engine 122 (as depicted in FIG. 2B by dashed lines 226) to be analyzed by server 102. In the event that configuration results 226 includes an error, server 102 may provide compliance configuration information handler 228 with an earlier version of confirmation information 112 so that any erroneous changes to the mobile device may be reversed, including by directing orchestrator engine 208 to rollback the state of the computing device to the state prior to execution of the state machine.

For example, in accordance with embodiments described herein, the state machine may contain configuration directives for the configuration scenario. To further illustrate, a state may be described by entities "FromState", "Activity", and "ToState". An Activity may have the form of executable code owned and created by configuration scenario owner(s). Furthermore, an Activity can return a different ToState state at runtime to be used to go to a next step. If the Activity, does not modify the Tostate, then the default ToState is used and is specified in the data representation of the state machine. An Activity may have predefined input data and output data expressed as XML that are marshalled to the Activity. This ensures that an individual Activity can be developed and tested individually. The ability to have an Activity modify the ToState allows for runtime adjustments to a state machine. The state machine may be used to configure, verify, refresh, and delete configuration scenarios.

Figure 3:
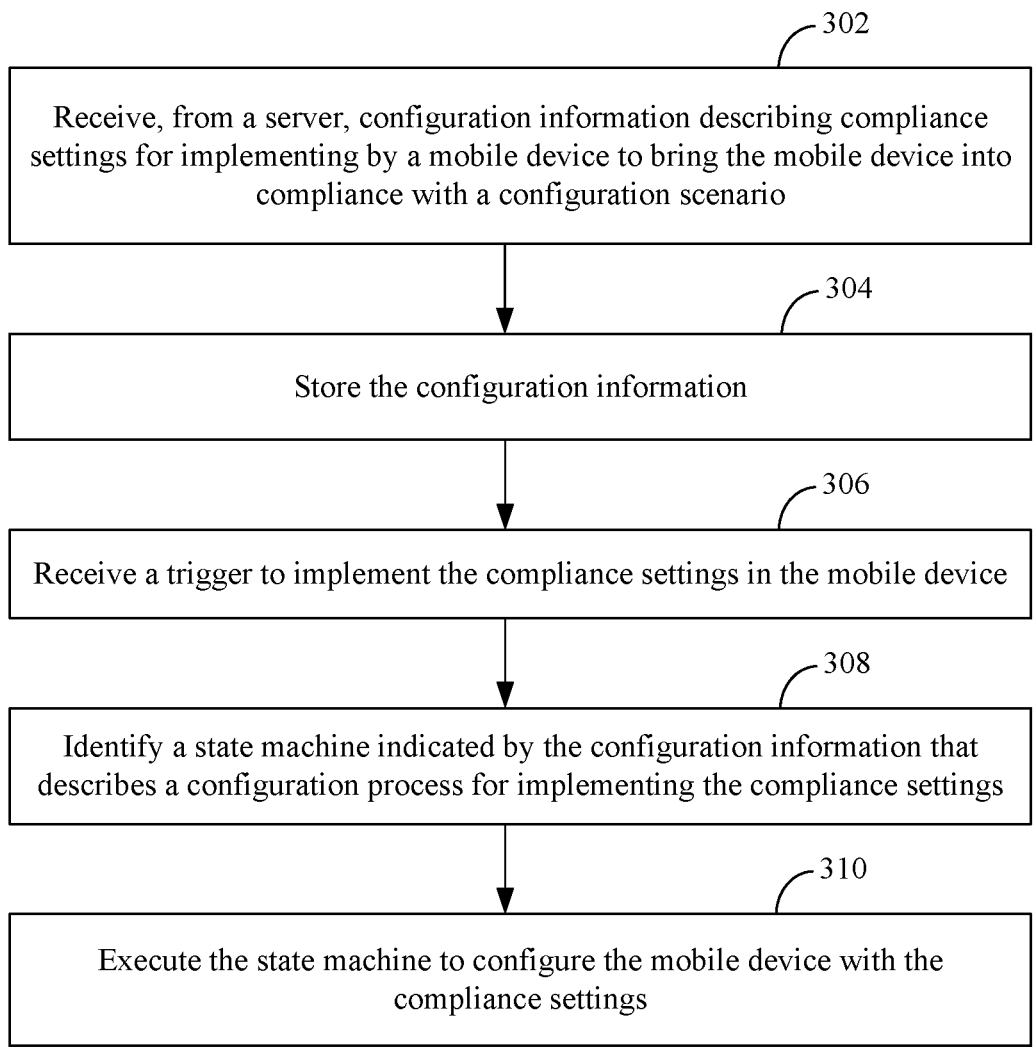
FIG. 3 depicts a flowchart of an example method for implementing compliance settings by a computing device for bringing the computing device into compliance with a configuration scenario in accordance with an example embodiment.

Systems 100, 200, and 230 may operate in various ways to perform its functions. For instance, FIG. 3 depicts a flowchart 300 of a method for implementing compliance settings by a computing device for bringing the computing device into compliance with a configuration scenario, according to an example embodiment. FIG. 3 is described with continued reference to FIGS. 1, 2A, and 2B. However, other structural and operational embodiments will be apparent to persons skilled in the relevant art(s) based on the following discussion regarding flowchart 300 and systems 100, 200, and 230 of FIGS. 1, 2A, and 2B.

As shown in FIG. 3, flowchart 300 begins at step 302. In step 302, configuration information is received from a server, the configuration information describing compliance settings for implementing by a mobile device to bring the mobile device into compliance with a configuration scenario. For example, with continued reference to FIGS. 1, 2A, and 2B, compliance configuration information handler 228 receives information 112 from compliance engine 122 of server 102.

In step 304, the configuration information is stored. For example, with continued reference to FIGS. 1, 2A, and 2B, compliance configuration information handler 228 stores configuration information 112 in configuration information data store 222.

In step 306, a trigger is received to implement the compliance settings in the mobile device. For example, with continued reference to FIGS. 1, 2A, and 2B, settings implementation triggerer 232 provides trigger 218 to state machine selector 234 of orchestrator engine 208, starting the implementation of compliance settings described by the configuration information 112 in computing device 244.

In step 308, a state machine, indicated by the configuration information that describes a configuration process for implementing the compliance settings, is identified. For example, with continued reference to FIGS. 1, 2A, and 2B, after receiving trigger 218, state selector machine 234 obtains stored configuration information 112 from configuration information data store 222 and determines that state machine 118 is associated with configuration information 112.

In step 310, with continued reference to FIGS. 1, 2A, and 2B, the state machine is executed to configure the mobile device with the compliance settings. For example, with continued reference to FIGS. 1, 2A, and 2B, state machine selector 234 provides state machine 118 (or a pointer thereto) to state machine execution engine 236 and state machine execution engine 236 executes state machine 118 to configure computing device 244 with compliance settings described in configuration information 112.

Figure 4:
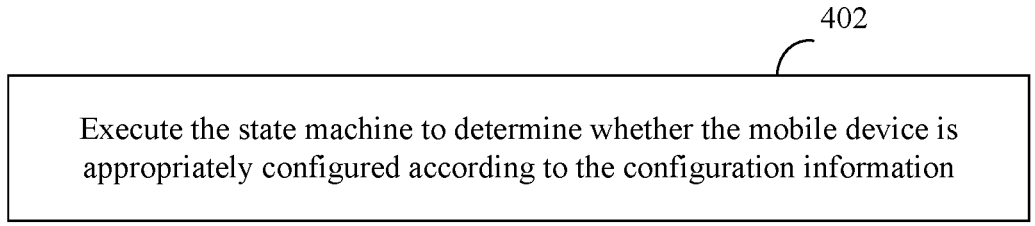
FIG. 4 depicts a flowchart of an example method for determining whether the mobile device is appropriately configured in accordance with an example embodiment.

FIG. 4 depicts a flowchart 400 of a method for determining whether the mobile device is appropriately configured according to the configuration information, according to an example embodiment. FIG. 4 is described with continued reference to FIGS. 1, 2A, and 2B. However, other structural and operational embodiments will be apparent to persons skilled in the relevant art(s) based on the following discussion regarding flowchart 400 and systems 100, 200, and 230 of FIGS. 1, 2A, and 2B.

As shown in FIG. 4, flowchart 400 includes step 402. In step 402, the state machine is executed to determine whether the mobile device is appropriately configured according to the configuration information. For example, with continued reference to FIGS. 1, 2A, and 2B, state machine execution engine 236 executes state machine 118 without modifying the configuration of computing device 244 to evaluate that computing device 244 is in the correct configuration state. In particular, in accordance with embodiments described herein, a state machine may run in either of two modes, a "Configure" mode and an "Analyze" mode. The Configure mode configures the computing device based on the configuration information (as described above). The Analyze mode performs an evaluation of the computing device without modification thereto to ensure the device is indeed in the correct configuration state. For example, the state machine be configured to retrieve one or more current settings and/or other information (related to a particular hardware/software/firmware configuration) of the computing device (e.g., determine an operating system version number, a version number of another application, an entry in a file such as a DLL (Dynamic-Link Library) file, etc.; determine the presence or absence of one or more files, etc.). The state machine may compare the retrieved information to correct configuration information maintained or accessible by the state machine for the computing device. If all the information matches, the state machine may indicate the computing device in compliance for the particular configuration. If not all information matches, the state machine may indicate the computing devices is not in compliance.

Figure 5:
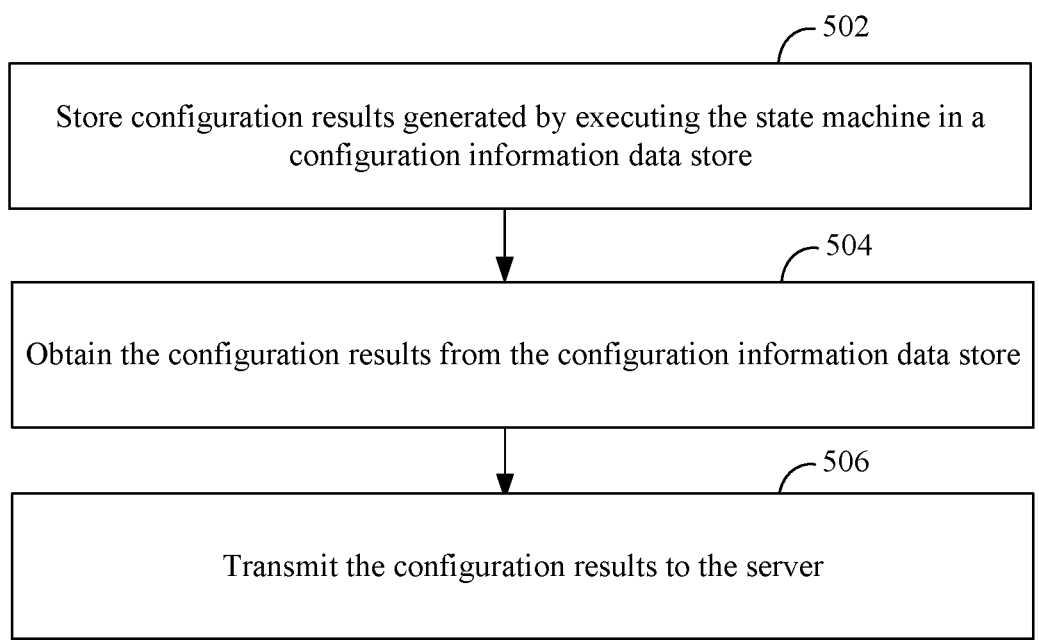
FIG. 5 depicts a flowchart of an example method for storing and transmitting configuration results in accordance with an example embodiment.

As described above, the results of a particular configuration performed by a state machine may be transmitted to the compliance engine. For example, FIG. 5 depicts a flowchart 500 of a method for storing and transmitting configuration results, according to an embodiment. FIG. 5 is described with continued reference to FIGS. 1, 2A, and 2B. However, other structural and operational embodiments will be apparent to persons skilled in the relevant art(s) based on the following discussion regarding flowchart 500 and systems 100, 200, and 230 of FIGS. 1, 2A, and 2B.

As shown in FIG. 5, flowchart 500 begins at step 502. In step 502, configuration results, generated by executing the state machine in a configuration information data store, are stored. For example, with continued reference to FIGS. 1, 2A, and 2B, state machine execution engine 236 stores configuration results 226 in configuration information data store 222. In embodiments, configuration results 226 may include one or more indications. For instance, configuration results 226 may provide an indication that the configuration setting(s) were successfully installed by orchestrator engine 208, the installation is in-progress, or that a failure occurred, and the configuration setting(s) were not successfully installed. If a failure occurred, configuration results 226 may include an indication of the failure, such as by listing one or more errors (by error code and/or description), event tracing (e.g., logging of information about state machine execution that may be used for debugging), and/or other diagnostic data generated by the state machine.

In steps 504 and 506, the configuration results from the configuration information data store are obtained (step 504) and transmitted to the server (step 506). For example, with continued reference to FIGS. 1, 2A, and 2B, compliance configuration information handler 228 obtains configuration results 226 from configuration information data store 222 and provides configuration results 226 to compliance engine 122 to be analyzed by server 102. In the event that configuration results 226 includes an error, server 102 may provide compliance configuration information handler 228 with an earlier version of confirmation information 112 so that any erroneous changes to the mobile device may be reversed, including by directing orchestrator engine 208 to rollback the state of the computing device to the state prior to execution of the state machine. For instance, prior to executing a state machine, or during the execution of the state machine, a current state of the computing device may be saved (e.g., saving versions of settings, affected files, etc., that existed prior to execution of the state machine), and the computing device may be reconfigured with the saved state by reverting the computing device to the saved state information. Alternatively, the computing device may be instructed to not rollback to the previous last known good state so that a detailed analysis may be performed of the failure state. For instance, another mode may be defined, referred to as a "developer mode" (or by another label), in which the computing device does not rollback to the last known good state in the event of an error.

Figure 6:
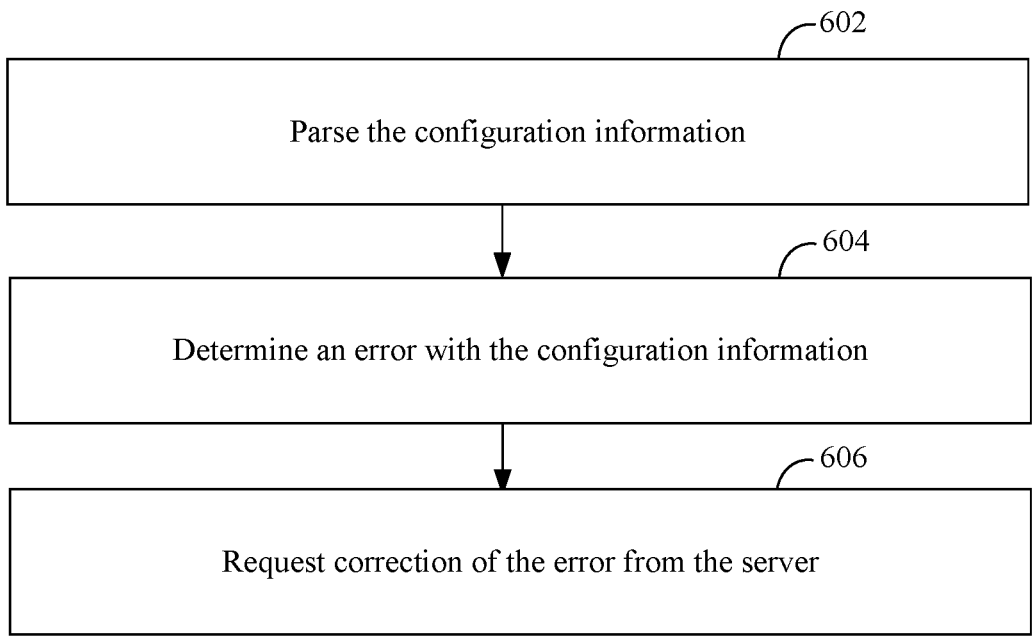
FIG. 6 depicts a flowchart of an example method for requesting correction of an error with configuration information in accordance with an embodiment.

Furthermore, note that if an error is encountered during execution of a state machine, the compliance agent may attempt to correct the error rather than rolling back to a prior state. For instance, FIG. 6 depicts a flowchart 600 of a method for requesting correction of an error with configuration information, according to an example embodiment. FIG. 6 is described with continued reference to FIGS. 1, 2A, and 2B. However, other structural and operational embodiments will be apparent to persons skilled in the relevant art(s) based on the following discussion regarding flowchart 600 and systems 100, 200, and 230 of FIGS. 1, 2A, and 2B.

Flowchart 600 begins with step 602. In step 602, the configuration information is parsed. For example, orchestrator engine 208 may be configured to parse configuration information 112 for one or more configuration settings that correspond to a received error code/error description.

In step 604, an error with the configuration information is determined. In an embodiment, during the parsing, orchestrator engine 208 may be determine the one or more configuration settings that correspond to a received error code/error description.

In step 606, correction of the error is requested from the server. In an embodiment, compliance agent 240 may transmit error information (e.g., an error code, an error description, an event tracing, etc.) to compliance 122 to request correction of the error.

For instance, with continued reference to FIGS. 1, 2A, and 2B, in the example discussed above in which configuration information 112 is represented by an XML file, configuration information error checker 210 may parse and verify the XML file, store the URIs in a registry location, and if any errors are detected, synchronously report the errors to server 102 and request server 102 to immediately amend the errors.

Figure 7:
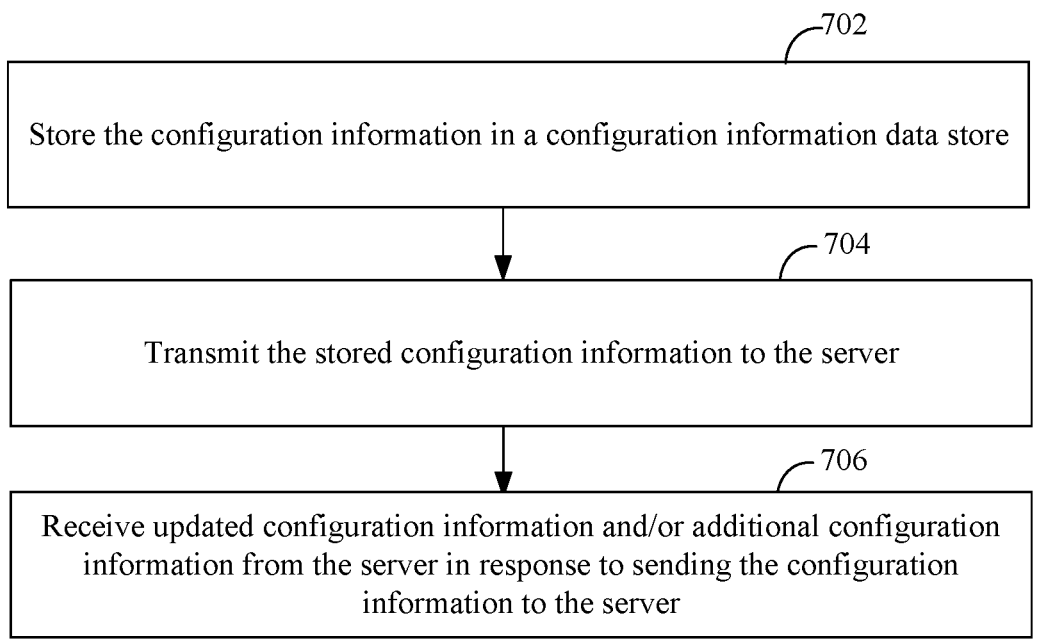
FIG. 7 depicts a flowchart of an example method for receiving updated configuration information and/or additional configuration information in accordance with an embodiment.

Note that in response to a request for correction of an error, and/or at any other time, compliance engine 122 may provide updated configuration information to a compliance agent. For instance, FIG. 7 depicts a flowchart 700 of a method for receiving updated configuration information and/or additional configuration information, according to an example embodiment. FIG. 7 is described with continued reference to FIGS. 1, 2A, and 2B. However, other structural and operational embodiments will be apparent to persons skilled in the relevant art(s) based on the following discussion regarding flowchart 700 and systems 100, 200, and 230 of FIGS. 1, 2A, and 2B.

As shown in FIG. 7, flowchart 700 begins with step 702. In step 702, the configuration information is stored in a configuration information data store. For example, with continued reference to FIGS. 2A and 2B, configuration information 112 is stored in configuration information data store 222.

In step 704, the stored configuration information is transmitted to the server. In embodiments, compliance agent 240 may transmit configuration 112 to compliance engine 122 at server 102 for any reason, including due to an error (as described above), to check for updates, and for any other reason. For instance, compliance configuration information handler 228 may verify the status (e.g., out of date or stale) of configuration information 112 stored in configuration information data store 222. If handler 228 determines configuration information 112 to contain an error, to be out of date, to be stale, etc., handler 228 may transmit configuration information 112 (or a portion thereof) to server 102

In step 706, updated configuration information and/or additional configuration information is received from the server in response to sending the configuration information to the server. Based on a status of stored configuration information 112 determined by server 102, server 102 may provide compliance configuration information handler 228 with updated configuration information and/or additional configuration information. As such, compliance configuration information handler 228 may update configuration information data store 222 with the updated configuration information and/or additional configuration information.

Accordingly, embodiments improve the efficiency of pushing configuration settings to large numbers of devices, and to maintaining track of the compliance of such devices with requirements based on their having received and implemented the configuration settings.

Embodiments reduces client/server latency (the delay before a transfer of data begins following an instruction for its transfer), by putting more responsibility onto the client devices to get themselves into the desired state. Each client device accepts the request to implement configuration settings from the server, turning immediately back to the server. The request is handled asynchronously by the client devices. When a client device has completed the request, it will initiate a session to send the server an alert indicating success or failure of the implementation of the configuration settings by the client device. Embodiments also reduce network activity between the client and server devices by removing the need for the server to continually monitor state of the client devices and in a piecemeal fashion maintain the desired device state. In embodiments, the server provides each client with the desired state (in the form of configuration settings) and expects the client to maintain the settings (and to notify the server, without prompting by the server, if unable to do so). Embodiments also provide a uniform manner, initiated by the server, to configure client devices with settings, rather than having service providers (e.g., software and/or hardware providers) to have to manage the process for their own products.

III. Example Mobile and Stationary Device Embodiments

The systems and methods described above, including the device compliance management embodiments described in reference to FIGS. 1-7, may be implemented in hardware, or hardware combined with one or both of software and/or firmware. For example, compliance engine 112, compliance agent 120, orchestrator engine 208, configuration information error checker 210, compliance agent 220, compliance configuration information handler 228, settings implementation triggerer 232, state machine selector 234, state machine execution engine 236, compliance agent 240 and/or each of the components described therein, and flowcharts 300, 400, 500, 600, and 700 may be each implemented as computer program code/instructions configured to be executed in one or more processors and stored in a computer readable storage medium. Alternatively, compliance engine 112, compliance agent 120, orchestrator engine 208, configuration information error checker 210, compliance agent 220, compliance configuration information handler 228, settings implementation triggerer 232, state machine selector 234, state machine execution engine 236, compliance agent 240 and/or each of the components described therein, and flowcharts 300, 400, 500, 600, and 700 may be implemented as hardware logic/electrical circuitry. In an embodiment, compliance engine 112, compliance agent 120, orchestrator engine 208, configuration information error checker 210, compliance agent 220, compliance configuration information handler 228, settings implementation triggerer 232, state machine selector 234, state machine execution engine 236, compliance agent 240 and/or each of the components described therein, and flowcharts 300, 400, 500, 600, and 700 may be implemented in one or more SoCs (system on chip). An SoC may include an integrated circuit chip that includes one or more of a processor (e.g., a central processing unit (CPU), microcontroller, microprocessor, digital signal processor (DSP), etc.), memory, one or more communication interfaces, and/or further circuits, and may optionally execute received program code and/or include embedded firmware to perform functions.

Figure 8:
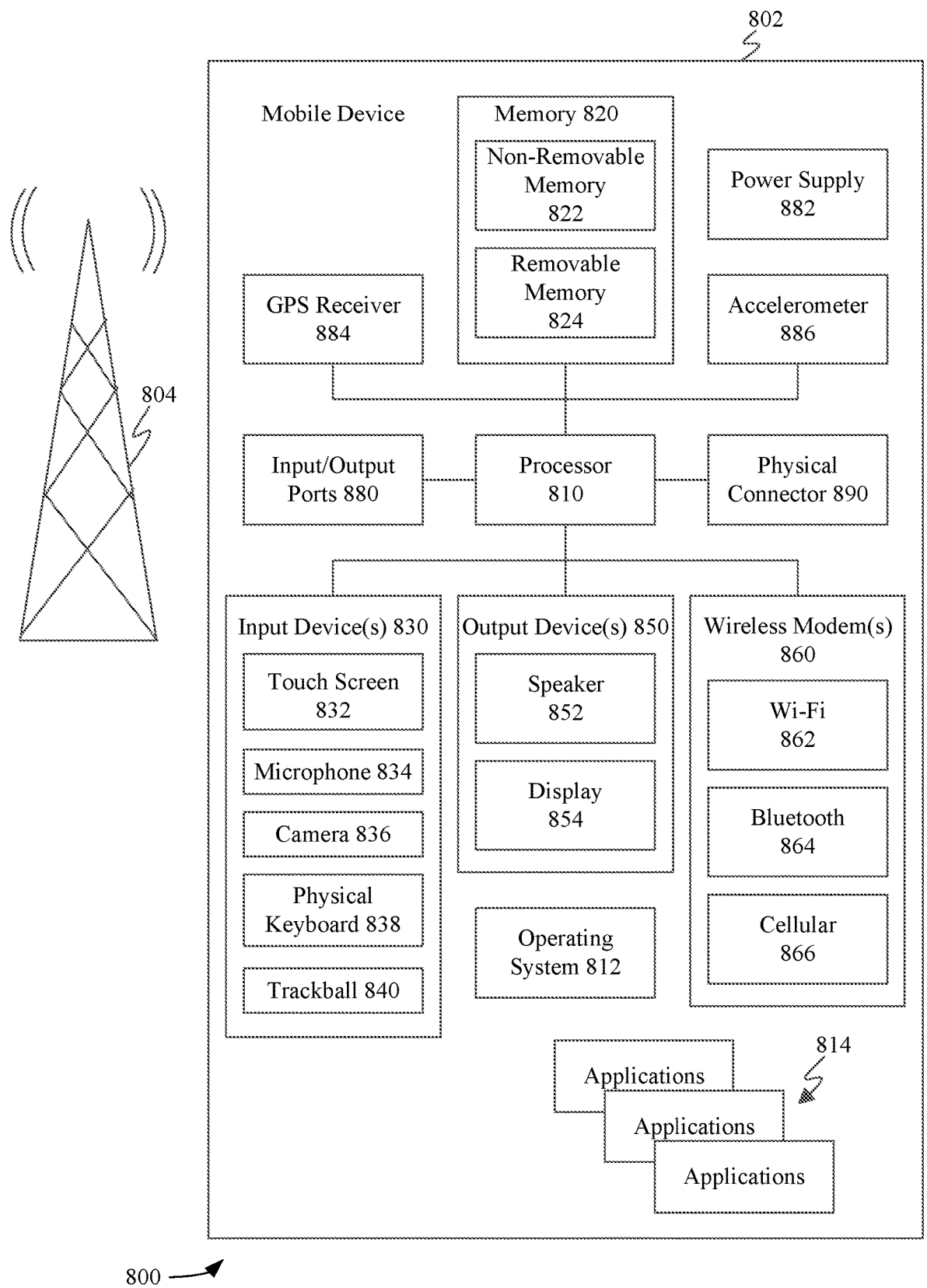
FIG. 8 is a block diagram of an exemplary user device in which embodiments may be implemented.

Furthermore, server 102, computing device(s) 104, computing device 204, and computing device 244 may each be implemented in various device types. For instance, FIG. 8 shows a block diagram of an exemplary mobile device 800 including a variety of optional hardware and software components, shown generally as components 802. Any number and combination of the features/elements of compliance engine 112, compliance agent 120, orchestrator engine 208, configuration information error checker 210, compliance agent 220, compliance configuration information handler 228, settings implementation triggerer 232, state machine selector 234, state machine execution engine 236, compliance agent 240, and/or flowcharts 300, 400, 500, 600, and 700 may be implemented as components 802 included in a mobile device embodiment, as well as additional and/or alternative features/elements, as would be known to persons skilled in the relevant art(s). It is noted that any of components 802 can communicate with any other of components 802, although not all connections are shown, for ease of illustration. Mobile device 800 can be any of a variety of mobile devices described or mentioned elsewhere herein or otherwise known (e.g., cell phone, smartphone, handheld computer, Personal Digital Assistant (PDA), etc.) and can allow wireless two-way communications with one or more mobile devices over one or more communications networks 804, such as a cellular or satellite network, or with a local area or wide area network.

The illustrated mobile device 800 can include a controller or processor referred to as processor circuit 810 for performing such tasks as signal coding, image processing, data processing, input/output processing, power control, and/or other functions. Processor circuit 810 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 810 may execute program code stored in a computer readable medium, such as program code of one or more applications 814, operating system 812, any program code stored in memory 820, etc. Operating system 812 can control the allocation and usage of the components 802 and support for one or more application programs 814 (a.k.a. applications, "apps", etc.). Application programs 814 can include common mobile computing applications (e.g., email applications, calendars, contact managers, web browsers, messaging applications) and any other computing applications (e.g., word processing applications, mapping applications, media player applications).

As illustrated, mobile device 800 can include memory 820. Memory 820 can include non-removable memory 822 and/or removable memory 824. The non-removable memory 822 can include RAM, ROM, flash memory, a hard disk, or other well-known memory storage technologies. The removable memory 824 can include flash memory or a Subscriber Identity Module (SIM) card, which is well known in GSM communication systems, or other well-known memory storage technologies, such as "smart cards." The memory 820 can be used for storing data and/or code for running operating system 812 and applications 814. Example data can include web pages, text, images, sound files, video data, or other data sets to be sent to and/or received from one or more network servers or other devices via one or more wired or wireless networks. Memory 820 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

A number of programs may be stored in memory 820. These programs include operating system 812, one or more application programs 814, and other program modules and program data. Examples of such application programs or program modules may include, for example, computer program logic (e.g., computer program code or instructions) for implementing the systems described above, including the device compliance management embodiments described in reference to FIGS. 1-7.

Mobile device 800 can support one or more input devices 830, such as a touch screen 832, microphone 834, camera 836, physical keyboard 838 and/or trackball 840 and one or more output devices 850, such as a speaker 852 and a display 854.

Other possible output devices (not shown) can include piezoelectric or other haptic output devices. Some devices can serve more than one input/output function. For example, touch screen 832 and display 854 can be combined in a single input/output device. The input devices 830 can include a Natural User Interface (NUI).

Wireless modem(s) 860 can be coupled to antenna(s) (not shown) and can support two-way communications between processor circuit 810 and external devices, as is well understood in the art. The modem(s) 860 are shown generically and can include a cellular modem 866 for communicating with the mobile communication network 804 and/or other radio-based modems (e.g., Bluetooth 764 and/or Wi-Fi 762). Cellular modem 866 may be configured to enable phone calls (and optionally transmit data) according to any suitable communication standard or technology, such as GSM, 3G, 4G, 5G, etc. At least one of the wireless modem(s) 860 is typically configured for communication with one or more cellular networks, such as a GSM network for data and voice communications within a single cellular network, between cellular networks, or between the mobile device and a public switched telephone network (PSTN).

Mobile device 800 can further include at least one input/output port 880, a power supply 882, a satellite navigation system receiver 884, such as a Global Positioning System (GPS) receiver, an accelerometer 886, and/or a physical connector 890, which can be a USB port, IEEE 1394 (FireWire) port, and/or RS-232 port. The illustrated components 802 are not required or all-inclusive, as any components can be not present and other components can be additionally present as would be recognized by one skilled in the art.

Figure 9:
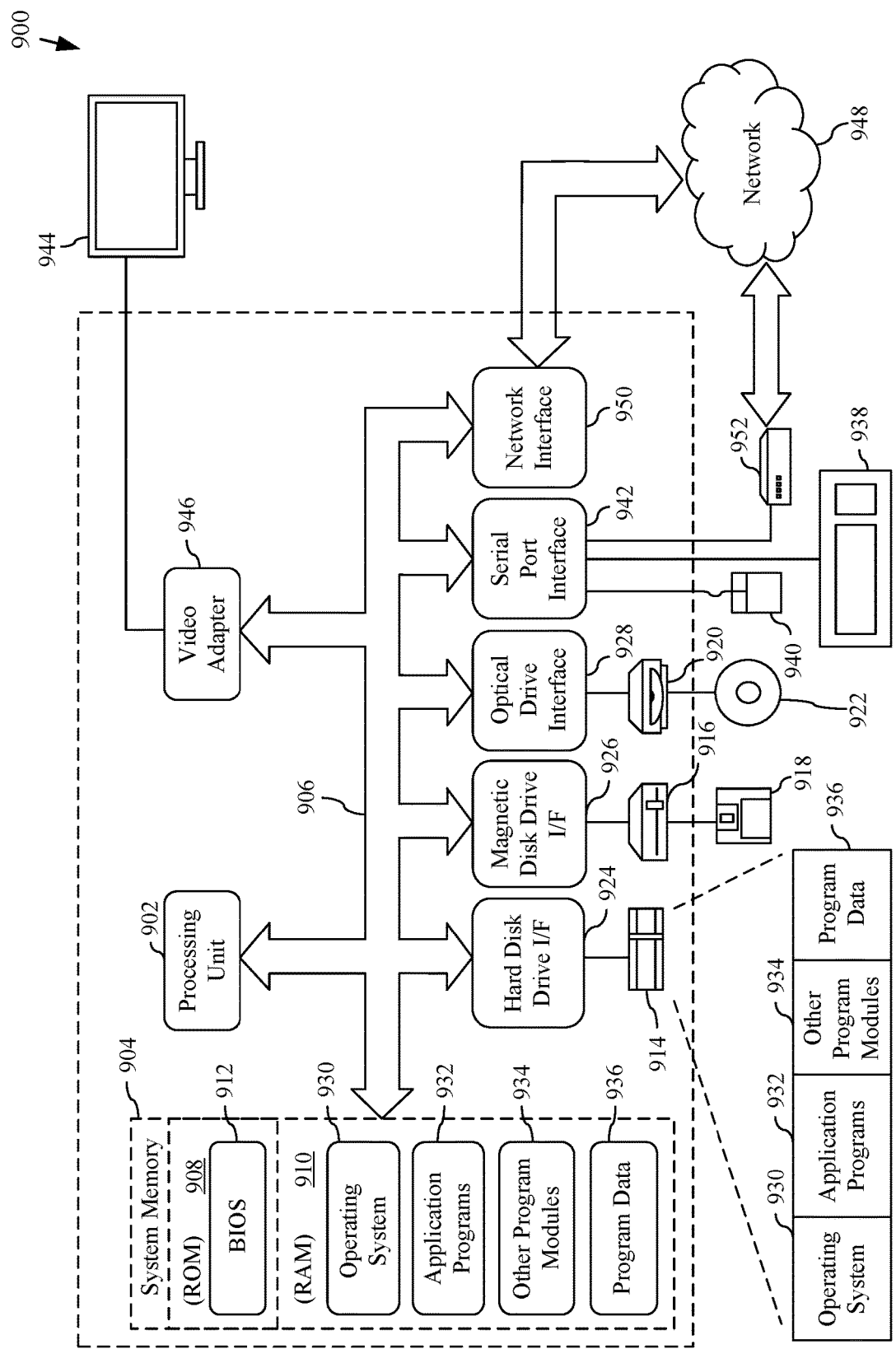
FIG. 9 is a block diagram of an example computing device that may be used to implement embodiments.

Furthermore, FIG. 9 depicts an exemplary implementation of a computing device 900 in which embodiments may be implemented, including computing device 104, computing device 204, computing device 244, server 102. The description of computing device 900 provided herein is provided for purposes of illustration, and is not intended to be limiting. Embodiments may be implemented in further types of computer systems, as would be known to persons skilled in the relevant art(s).

As shown in FIG. 9, computing device 900 includes one or more processors, referred to as processor circuit 902, a system memory 904, and a bus 906 that couples various system components including system memory 904 to processor circuit 902. Processor circuit 902 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 902 may execute program code stored in a computer readable medium, such as program code of operating system 930, application programs 932, other programs 934, etc. Bus 906 represents one or more of any of several types of bus structures, including a memory bus or memory controller, a peripheral bus, an accelerated graphics port, and a processor or local bus using any of a variety of bus architectures. System memory 904 includes read only memory (ROM) 908 and random access memory (RAM) 910. A basic input/output system 912 (BIOS) is stored in ROM 908.

Computing device 900 also has one or more of the following drives: a hard disk drive 914 for reading from and writing to a hard disk, a magnetic disk drive 916 for reading from or writing to a removable magnetic disk 918, and an optical disk drive 920 for reading from or writing to a removable optical disk 922 such as a CD ROM, DVD ROM, or other optical media. Hard disk drive 914, magnetic disk drive 916, and optical disk drive 920 are connected to bus 906 by a hard disk drive interface 924, a magnetic disk drive interface 926, and an optical drive interface 928, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media.

A number of program modules may be stored on the hard disk, magnetic disk, optical disk, ROM, or RAM. These programs include operating system 930, one or more application programs 932, other programs 934, and program data 936. Application programs 932 or other programs 934 may include, for example, computer program logic (e.g., computer program code or instructions) for implementing the systems described above, including the device compliance management embodiments described in reference to FIGS. 1-7.

A user may enter commands and information into the computing device 900 through input devices such as keyboard 938 and pointing device 940. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 902 through a serial port interface 942 that is coupled to bus 906, but may be connected by other interfaces, such as a parallel port, game port, or a universal serial bus (USB).

A display screen 944 is also connected to bus 906 via an interface, such as a video adapter 846. Display screen 844 may be external to, or incorporated in computing device 900. Display screen 944 may display information, as well as being a user interface for receiving user commands and/or other information (e.g., by touch, finger gestures, virtual keyboard, etc.). In addition to display screen 944, computing device 900 may include other peripheral output devices (not shown) such as speakers and printers.

Computing device 900 is connected to a network 948 (e.g., the Internet) through an adaptor or network interface 950, a modem 952, or other means for establishing communications over the network. Modem 952, which may be internal or external, may be connected to bus 906 via serial port interface 942, as shown in FIG. 9, or may be connected to bus 906 using another interface type, including a parallel interface.

As used herein, the terms "computer program medium," "computer-readable medium," and "computer-readable storage medium" are used to generally refer to physical hardware media such as the hard disk associated with hard disk drive 914, removable magnetic disk 918, removable optical disk 922, other physical hardware media such as RAMs, ROMs, flash memory cards, digital video disks, zip disks, MEMs, nanotechnology-based storage devices, and further types of physical/tangible hardware storage media (including system memory 904 of FIG. 9). Such computer-readable storage media are distinguished from and non-overlapping with communication media (do not include communication media). Communication media typically embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media.

As noted above, computer programs and modules (including application programs 932 and other programs 934) may be stored on the hard disk, magnetic disk, optical disk, ROM, RAM, or other hardware storage medium. Such computer programs may also be received via network interface 950, serial port interface 952, or any other interface type. Such computer programs, when executed or loaded by an application, enable computing device 900 to implement features of embodiments discussed herein. Accordingly, such computer programs represent controllers of the computing device 900.

Embodiments are also directed to computer program products comprising computer code or instructions stored on any computer-readable medium. Such computer program products include hard disk drives, optical disk drives, memory device packages, portable memory sticks, memory cards, and other types of physical storage hardware.

IV. Additional Exemplary Embodiments

In an embodiment, a mobile device comprises at least one processor circuit; and at least one memory that stores program code configured to be executed by the at least one processor circuit, the program code comprising: a configuration manager configured to receive, from a server, configuration information describing compliance settings for implementing by the mobile device to bring the mobile device into compliance with a configuration scenario, and store the configuration information; and an orchestrator engine configured to receive a trigger from the configuration manager to implement the compliance settings in the mobile device; identify a state machine indicated by the configuration information that describes a configuration process for implementing the compliance settings, and execute the state machine to configure the mobile device with the compliance settings.

In an embodiment of the foregoing mobile device, the orchestrator engine is further configured to execute the state machine to determine whether the mobile device is appropriately configured according to the configuration information.

In an embodiment of the foregoing mobile device, the orchestrator engine is further configured to store configuration results generated by executing the state machine in a configuration information data store; and the configuration manager is further configured to obtain the configuration results from the configuration information data store and transmit the configuration results to the server.

In an embodiment of the foregoing mobile device, the configuration manager is further configured to: parse the configuration information; determine an error with the configuration information; and request correction of the error from the server.

In an embodiment of the foregoing mobile device, the configuration manager is further configured to: store the configuration information in a configuration information data store; transmit the stored configuration information to the server; and receive updated configuration information and/or additional configuration information from the server in response to sending the configuration information to the server.

In an embodiment of the foregoing mobile device, the state machine is stored in a state machine data store on the mobile device.

In an embodiment of the foregoing mobile device, the configuration information is received from the server in an Extensible Markup Language (XML) file including a payload associated with the compliance settings and a corresponding Uniform Resource Identifier (URI) for downloading and processing of the payload.

In another embodiment, a method comprises: receiving, from a server, configuration information describing compliance settings for implementing by a mobile device to bring the mobile device into compliance with a configuration scenario; storing the configuration information; receiving a trigger to implement the compliance settings in the mobile device; identifying a state machine indicated by the configuration information that describes a configuration process for implementing the compliance settings; and executing the state machine to configure the mobile device with the compliance settings.

In an embodiment, the foregoing method further comprises: executing the state machine to determine whether the mobile device is appropriately configured according to the configuration information.

In an embodiment, the foregoing method further comprises: storing configuration results generated by executing the state machine in a configuration information data store; obtaining the configuration results from the configuration information data store; and transmitting the configuration results to the server.

In an embodiment, the foregoing method further comprises: parsing the configuration information; determining an error with the configuration information; and requesting correction of the error from the server.

In an embodiment, the foregoing method further comprises: storing the configuration information in a configuration information data store; transmitting the stored configuration information to the server; and receiving updated configuration information and/or additional configuration information from the server in response to sending the configuration information to the server.

In an embodiment of the foregoing method, the state machine is stored in a state machine data store on the mobile device.

In an embodiment of the foregoing method, the configuration information is received from the server in an Extensible Markup Language (XML) file including a payload associated with the compliance settings and a corresponding Uniform Resource Identifier (URI) for downloading and processing of the payload.

In another embodiment, a computer-readable storage medium having program instructions recorded thereon that, when executed by at least one processing circuit of a mobile device, perform a method, comprises: receiving, from a server, configuration information describing compliance settings for implementing by a mobile device to bring the mobile device into compliance with a configuration scenario; storing the configuration information; receiving a trigger to implement the compliance settings in the mobile device; identifying a state machine indicated by the configuration information that describes a configuration process for implementing the compliance settings; and executing the state machine to configure the mobile device with the compliance settings.

In an embodiment of the foregoing method comprises: executing the state machine to determine whether the mobile device is appropriately configured according to the configuration information.

In an embodiment of the foregoing method comprises: the method further comprises: storing configuration results generated by executing the state machine in a configuration information data store; obtaining the configuration results from the configuration information data store; and transmitting the configuration results to the server.

In an embodiment of the foregoing method comprises: parsing the configuration information; determining an error with the configuration information; and requesting correction of the error from the server.

In an embodiment of the foregoing method comprises: storing the configuration information in a configuration information data store; transmitting the stored configuration information to the server; and receiving updated configuration information and/or additional configuration information from the server in response to sending the configuration information to the server.

In an embodiment of the foregoing method, the configuration information is received from the server in an Extensible Markup Language (XML) file including a payload associated with the compliance settings and a corresponding Uniform Resource Identifier (URI) for downloading and processing of the payload.

V. Conclusion

While various embodiments have been described above, it should be understood that they have been presented by way of example only, and not limitation. It will be apparent to persons skilled in the relevant art that various changes in form and detail can be made therein without departing from the spirit and scope of the embodiments. Thus, the breadth and scope of the embodiments should not be limited by any of the above-described exemplary embodiments, but should be defined only in accordance with the following claims and their equivalents.

What is claimed is:

1. A computing device, comprising:
at least one processor circuit; and
at least one memory that stores program code configured to be executed by the at least one processor circuit, the program code configured to perform operations comprising:
receiving, from a server, configuration information including compliance settings configured to adjust the computing device into compliance with a configuration scenario;
identifying a state machine describing a configuration process for implementing the compliance settings on the computing device, the state machine being indicated by the configuration information and being implemented by the computing device;
configuring, by executing the state machine in a first mode for configuring compliance settings, the computing device with the compliance settings, wherein at least one configuration service provider is invoked in an order dictated by the state machine to implement the compliance settings; and
determining, by executing the state machine in a second mode for validating compliance setting configurations, whether the computing device is configured according to the configuration information.

2. The computing device of claim 1, wherein the program code is further configured to perform operations comprising:
   determining an error in the received configuration information; and
   transmitting a request for correction of the error to the server.

3. The computing device of claim 1, wherein the program code is further configured to perform operations comprising:
   storing configuration results generated by execution of the state machine in a configuration information data store;
   obtaining the configuration results from the configuration information data store; and
   transmitting the configuration results to the server.

4. The computing device of claim 1, wherein the program code is further configured to perform operations comprising:
   identifying the state machine indicated by the configuration information, the state machine configured to dictate an order in which the compliance settings are implemented, and
   configuring, by execution of the state machine, the computing device with the compliance settings of the configuration information according to the order.

5. The computing device of claim 1, wherein the configuration information is received from the server in an Extensible Markup Language (XML) file including a payload associated with the compliance settings and a corresponding Uniform Resource Identifier (URI) for downloading and processing of the payload.

6. The computing device of claim 1, wherein the program code is further configured to perform operations comprising:
   upon detection of a triggering event, determining whether the computing device remains in compliance with the configuration scenario, the triggering event including one of:
      an expiration of a predetermined time period, or
      a request from an administrator, an auditor, or an entity that determines whether the computing device is in compliance.

7. The computing device of claim 1, wherein the configuration information further includes a designation of a user-device pairing maintained at the server in a configuration reference, the user-device pairing corresponding to the user and the computing device.

8. A method implemented in a computing device, comprising:
   receiving, from a server, configuration information including compliance settings configured to adjust the computing device into compliance with a configuration scenario;
   receiving updated configuration information from the server;
   identifying a state machine describing a configuration process for implementing the compliance settings on the computing device, the state machine being indicated by the configuration information and being implemented by the computing device;
   configuring, by executing the state machine in a first mode for configuring compliance settings, the computing device with the compliance settings, wherein at least one configuration service provider is invoked in an order dictated by the state machine to implement the compliance settings; and
   determining, by executing the state machine in a second mode for validating compliance setting configurations, whether the computing device is configured according to the configuration information.

9. The method of claim 8, wherein the method further comprises:
   determining an error in the received configuration information; and
   transmitting a request for correction of the error to the server.

10. The method of claim 8, further comprising:
    storing configuration results generated by execution of the state machine in a configuration information data store;
    obtaining the configuration results from the configuration information data store; and
    transmitting the configuration results to the server.

11. The method of claim 8, further comprising:
    upon detection of a triggering event, determining whether the computing device remains in compliance with the configuration scenario, the triggering event including one of:
       an expiration of a predetermined time period, or
       a request from an administrator, an auditor, or an entity that determines whether the computing device is in compliance.

12. The method of claim 8, wherein method further comprising:
    identifying the state machine indicated by the configuration information, the state machine configured to dictate an order in which the compliance settings are implemented, and
    configuring, by execution of the state machine, the computing device with the compliance settings of the updated configuration information according to the order.

13. The method of claim 8, wherein the configuration information further includes a designation of a user-device pairing maintained at the server in a configuration reference, the user-device pairing corresponding to the user and the computing device.

14. The method of claim 8, wherein the configuration information is received from the server in an Extensible Markup Language (XML) file including a payload associated with the compliance settings and a corresponding Uniform Resource Identifier (URI) for downloading and processing of the payload.

15. A computer-readable storage medium having program instructions recorded thereon that, when executed by at least one processing circuit of a computing device, perform a method in the computing device, the method comprising:
    receiving, from a server, configuration information including compliance settings configured to adjust the computing device into compliance with a configuration scenario;
    identifying a state machine describing a configuration process for implementing the compliance settings on the computing device, the state machine being indicated by the configuration information and being implemented by the computing device;
    configuring, by executing the state machine in a first mode for configuring compliance settings, the computing device with the compliance settings, wherein at least one configuration service provider is invoked in an order dictated by the state machine to implement the compliance settings; and
    determining, by executing the state machine in a second mode for validating compliance setting configurations, whether the computing device is configured according to the configuration information.

16. The computer-readable storage medium of claim 15, wherein the method further comprises:
   determining an error in the received configuration information; and
   transmitting a request for correction of the error to the server.

17. The computer-readable storage medium of claim 15, wherein the method further comprises:
   storing configuration results generated by execution of the state machine in a configuration information data store;
   obtaining the configuration results from the configuration information data store; and
   transmitting the configuration results to the server.

18. The computer-readable storage medium of claim 15, wherein the method further comprises:
   upon detection of a triggering event, determining whether the computing device remains in compliance with the configuration scenario, the triggering event including one of:
      an expiration of a predetermined time period, or
      a request from an administrator, an auditor, or an entity that determines whether the computing device is in compliance.

19. The computer-readable storage medium of claim 15, wherein the method further comprises:
   identifying the state machine indicated by the configuration information, the state machine configured to dictate an order in which the compliance settings are implemented, and
   configuring, by execution of the state machine, the computing device with the compliance settings of the configuration information according to the order.

20. The computer-readable storage medium of claim 15, wherein the at least one configuration service provider is an interface implemented by the device to interact with the compliance settings.

* * * * *